United States Patent
Amarquaye et al.

(10) Patent No.: US 11,859,585 B2
(45) Date of Patent: Jan. 2, 2024

(54) ELECTRICAL CONNECTOR

(71) Applicant: DELPHI TECHNOLOGIES IP LIMITED, St. Michael (BB)

(72) Inventors: Lydia Amarquaye, Cheltenham (GB); Jack Coxon, Cheltenham (GB); Adrian Lord, Minchinhampton (GB)

(73) Assignee: DELPHI TECHNOLOGIES IP LIMITED, St Michael (BB)

( * ) Notice: Subject to any disclaimer, the term of this patent is extended or adjusted under 35 U.S.C. 154(b) by 0 days.

(21) Appl. No.: 18/028,124

(22) PCT Filed: Sep. 24, 2021

(86) PCT No.: PCT/EP2021/076295
§ 371 (c)(1),
(2) Date: Mar. 23, 2023

(87) PCT Pub. No.: WO2022/063946
PCT Pub. Date: Mar. 31, 2022

(65) Prior Publication Data
US 2023/0304463 A1    Sep. 28, 2023

(30) Foreign Application Priority Data
Sep. 24, 2020   (GB) ...................... 2015121

(51) Int. Cl.
*F02M 59/44*     (2006.01)
*H01R 13/405*    (2006.01)
(Continued)

(52) U.S. Cl.
CPC ........... *F02M 59/44* (2013.01); *B60R 16/023* (2013.01); *H01R 13/405* (2013.01); *H01R 13/521* (2013.01); *H01R 2201/26* (2013.01)

(58) Field of Classification Search
CPC .... F02M 59/44; B60R 16/023; H01R 13/405; H01R 13/521; H01R 2201/26
See application file for complete search history.

(56) References Cited

U.S. PATENT DOCUMENTS

2007/0044772 A1\* 3/2007 Sakamoto .............. F02M 37/10
123/509
2013/0189867 A1 7/2013 Cameron et al.
(Continued)

FOREIGN PATENT DOCUMENTS

EP    1471302 A2   10/2004
GB    2192316 A    1/1988

OTHER PUBLICATIONS

International Search Report for PCT/EP2021/076295 dated Jan. 4, 2022, 3 pages.

*Primary Examiner* — Peter G Leigh
*Assistant Examiner* — Nader J Alhawamdeh
(74) *Attorney, Agent, or Firm* — Warner Norcross + Judd LLP

(57) ABSTRACT

An electrical connector for an electrical connection within a fuel system, the electrical connector comprising first and second electrical connector pins, and an overmould for the first and second electrical connector pins. Each of the first and second electrical connector pins includes an external portion which projects from the overmould, an internal portion to which the overmould is applied, and a chamfered portion located between the internal portion and the external portion. The internal portion of each of the first and second electrical connector pins includes a region having a first dimension adjacent to the chamfered region and at least two axially spaced projections which extend radially from the internal portion beyond the region having a first dimension, adjacent ones of the axially spaced projections being sepa- (Continued)

rated axially by a region of the internal portion having a reduced dimension compared to the region having a first dimension.

12 Claims, 5 Drawing Sheets

(51) Int. Cl.
  *B60R 16/023* (2006.01)
  *H01R 13/52* (2006.01)

(56) References Cited

U.S. PATENT DOCUMENTS

2019/0063389 A1\* 2/2019 Haines ................... F02M 37/06
2021/0210904 A1\* 7/2021 Pacher ................... H01R 35/00

\* cited by examiner

ELECTRICAL CONNECTOR

CROSS-REFERENCE TO RELATED APPLICATIONS

This application is the U.S. National Stage of International Application No. PCT/EP2021/076295 filed on 24 Sep. 2021, which claims priority to and all advantages of United Kingdom Application No. 2015121.3 filed on 24 Sep. 2020, the contents of which are incorporated herein by reference.

FIELD OF INVENTION

The invention relates to an electrical connector for use in a fuel system. In particular, but not exclusively, the invention relates to an electrical connector for use in a fuel injection system of an internal combustion engine. Aspects of the invention relate to an electrical connector and to a fuel pump comprising an electrical connector.

BACKGROUND

In combustion engine systems, a fuel pump is used to pressurise fuel before it is injected into the cylinders of the engine. Modern compression-ignition engine systems use a high pressure fuel pump to feed a common rail fuel volume which acts as a reservoir to store the pressurised fuel and feed the individual fuel injectors. The individual injectors are controlled by an engine control unit (ECU). In compression-ignition internal engines the fuel is pressurised to very high levels, typically in excess of 2000 bar. Such high pressures are difficult to manage and engine designers have to pay careful attention to controlling fuel leakages within the engine to guard against system inefficiency, as well as damage to parts.

As well as controlling the fuel injectors, valve arrangements in the fuel pump are also controlled electronically by the ECU. In this scenario, it is necessary to form an electrical connection between the fuel pump and the ECU so that the pump must be provided with an electrical connector for receiving a cooperable electrical connector in connection with the ECU. Thus, the fuel pump within which fuel is being pressurised to a very high level has a direct physical connection to electrical parts. This particular electrical connection between the fuel pump and the ECU present challenges due to fuel leakage from the pump which needs to be kept away from the components of the electrical connector to prevent damage.

It is against this background that the invention has been devised.

STATEMENTS OF INVENTION

According to an aspect of the invention, there is provided an electrical connector for providing, when connected to a complementary electrical connector, an electrical connection within a fuel system. The electrical connector comprises first and second electrical connector pins; and an overmould for the first and second electrical connector pins. Each of the first and second electrical connector pins includes an external portion which projects from the overmould, an internal portion which is received within the overmould, and a chamfered portion located between the internal portion and the external portion. The internal portion of each of the first and second electrical connector pins includes a region having a first dimension, the region being adjacent to the chamfered region. The internal portion also includes at least two axially spaced projections which extend radially from the internal portion beyond the first dimension region, adjacent ones of the axially spaced projections being separated axially by a region of the internal portion having a reduced dimension compared to the first dimension region to define a recess between adjacent ones of the projections.

In one embodiment, the first and second electrical connector pins may be of cylindrical form so that the first dimension is a first diameter of the region and the reduced dimension is a reduced diameter compared to the first diameter.

It is particularly convenient for the electrical connector pins to be of cylindrical form, both the region of a first dimension and the region of the internal portion have a reduced dimension compared to the first dimension.

Other formations and cross sections are possible for the connector pins, including square, rectangular or flat connector pins, for example.

The invention provides the advantage that an enhanced sealing area is provided between the overmould and the internal portion of each electric connector pin. The enhanced sealing area is implemented by means of an increased number of axially spaced projections along the internal portion of the electrical connector pin and the provision of the first dimension/diameter region adjacent to the chamfered region. The first dimension/diameter region effectively defines an additional step region adjacent to the chamfered region (i.e. immediately adjacent to the chamfered region) which adds to the enhanced sealing area, together with the plurality of axially spaced projections. This provides an enhanced sealing capability for the overmould as the increased area of contact with the convoluted pin cross section increases the loading of the overmould material onto the pins. Hence, any leakage which may otherwise occur between the overmould and the electrical connector pins, for example which may arise from the fuel pump of the fuel system, is substantially reduced or avoided.

In one embodiment where the electrical connector pins are of cylindrical form, the first diameter region is immediately adjacent or directly next to an end one of the projections. In other words, there is no other region between the first diameter region and the end one of the projections.

For example, the axially spaced projections may be annular projections carried by the internal portion. Typically, for example, the internal portion of each of the first and second electrical connector pins includes at least three axially spaced projections. The axially spaced projections may be equi-axially spaced along the internal portion.

In one example, the axial length of at least one of the projections is between 1.0 and 2.0 times the axial length of one of the recesses.

It may be convenient to form the or each projection so that the axial length of at least one of the projections is the same as the depth of at least one of the recesses. Specifically, each of the axially spaced projections may have an axial length which is the same as that of the other projections.

Each of the annular recesses may have a depth which is the same as that of the other annular recess or recesses.

According to a second aspect of the invention, there is provided a pump comprising an electrical connector of the previous aspect of the invention in electrical connection with an electrical connector of the pump.

According to a third aspect of the invention, there is provided a fuel system comprising a pump, a controller for the pump and an electrical connector of a previous aspect of the invention for providing an electrical connection between the controller and the pump.

It will be appreciated that preferred or optional features of the first aspect of the invention may be incorporated alone or in combination within the other aspects of the invention also.

BRIEF DESCRIPTION OF THE DRAWINGS

The above and other aspects of the invention will now be described, by way of example only, with reference to the accompanying drawings, in which.

SPECIFIC DESCRIPTION

Figure 1:
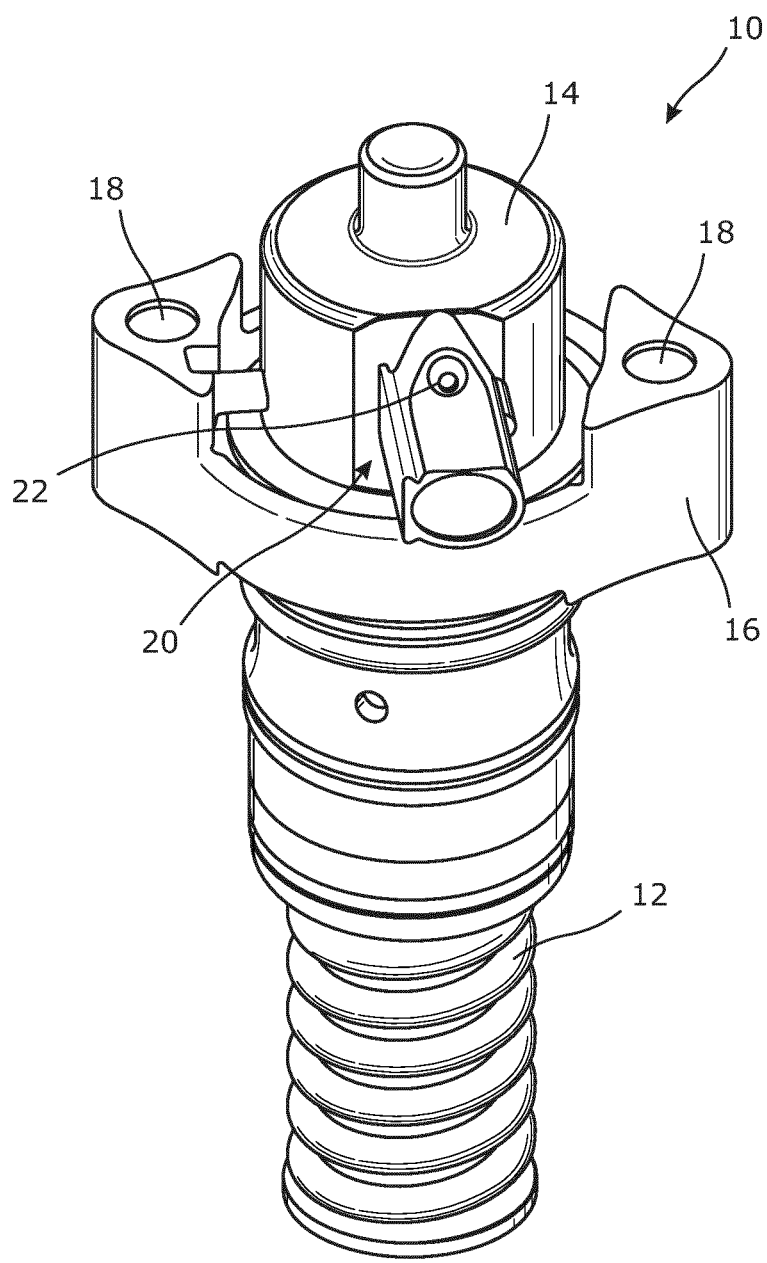
FIG. 1 is a perspective view of a fuel pump together with an electrical connector.

FIG. 1 shows a perspective cut-away view of a part a high pressure fuel pump, or pumping unit, 10 for an internal combustion engine, particularly a compression-ignition internal combustion engine. The pumping unit 10 includes a pumping plunger (not shown) which extends through a plunger return spring 12 so that the longitudinal axis of the plunger is vertically aligned, in the orientation shown in the illustration. A pump housing 14 located above (in the illustration shown) the plunger return spring 12 projects through a mounting flange 16 for attaching the pumping unit 10 within the engine via bolts to be received within bolt holes 18 in the mounting flange. The pump housing 10 is provided with an electrical connector for enabling valves (not shown) forming part of the pumping unit 10 to be connected to the electronic control unit (ECU) (not shown) of the engine in a conventional manner.

The electrical connector 20 projects perpendicularly from the pump housing 14, relative to the axis of the pumping plunger, and is connected to the pump housing 14 by means of screws 22 (only one of which is shown) which engage with at least one, and preferably two, locating bushes (not shown in FIG. 1).

Figure 2:
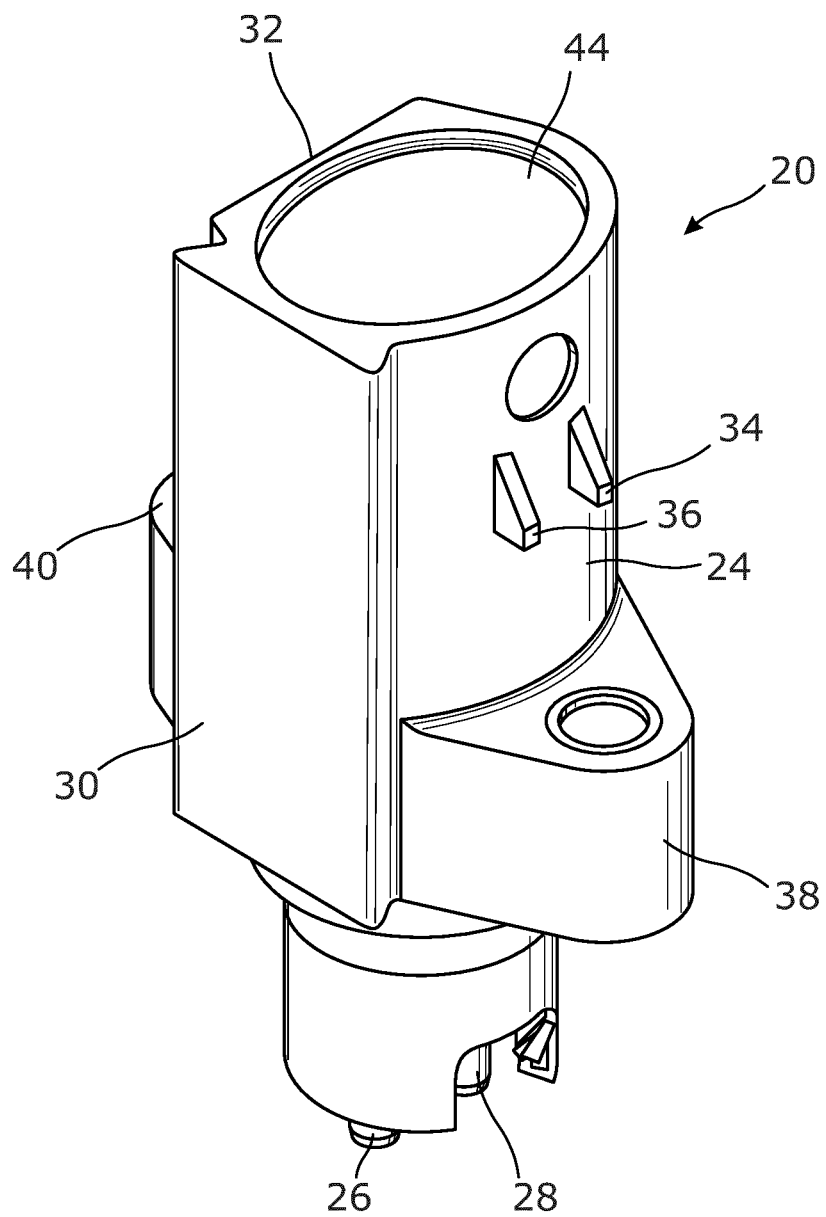
FIG. 2 shows a perspective view of the electrical connector shown in FIG. 1, in isolation.

Referring also to FIG. 2, the electrical connector 20 includes a generally tubular connector body 24 which is formed by overmoulding a thermoplastic material over first and second electrical connector pins, 26, 28 respectively, each of which is of substantially cylindrical form. The external surface of the overmoulded connector body 24 defines a curved surface, having first and second flat wall regions 30, 32. The external shape of the connector body 24 may take many different shapes and/or configurations depending on the nature of the fuel system in which the electrical connector 20 is used and the available space for locating the electrical connector 20.

First and second locating pins 34, 36 are provided in the curved surface of the connector body 20. The locating pins 34, 36 serve to retain the connector body 20 with the engine harness which forms the connection to the ECU. A side flange 38 forming part of the overmould for the connector body 24, is located part way along the length of the connector body 24. The side flange 38 provides a convenient attachment point for the connector body 24 to the engine. A further side flange 40 is just visible in FIG. 2 and is provided for the same purpose. Each flange 38, 40 includes a locating bush as described previously (only one of which, 42, is visible in FIG. 2). The locating bushes 42 are made from steel (or another hard material) to prevent mounting bolts (not shown), which are to be received through the bushes, from deforming the material of the overmoulded flanges 38, 40.

Figure 3:
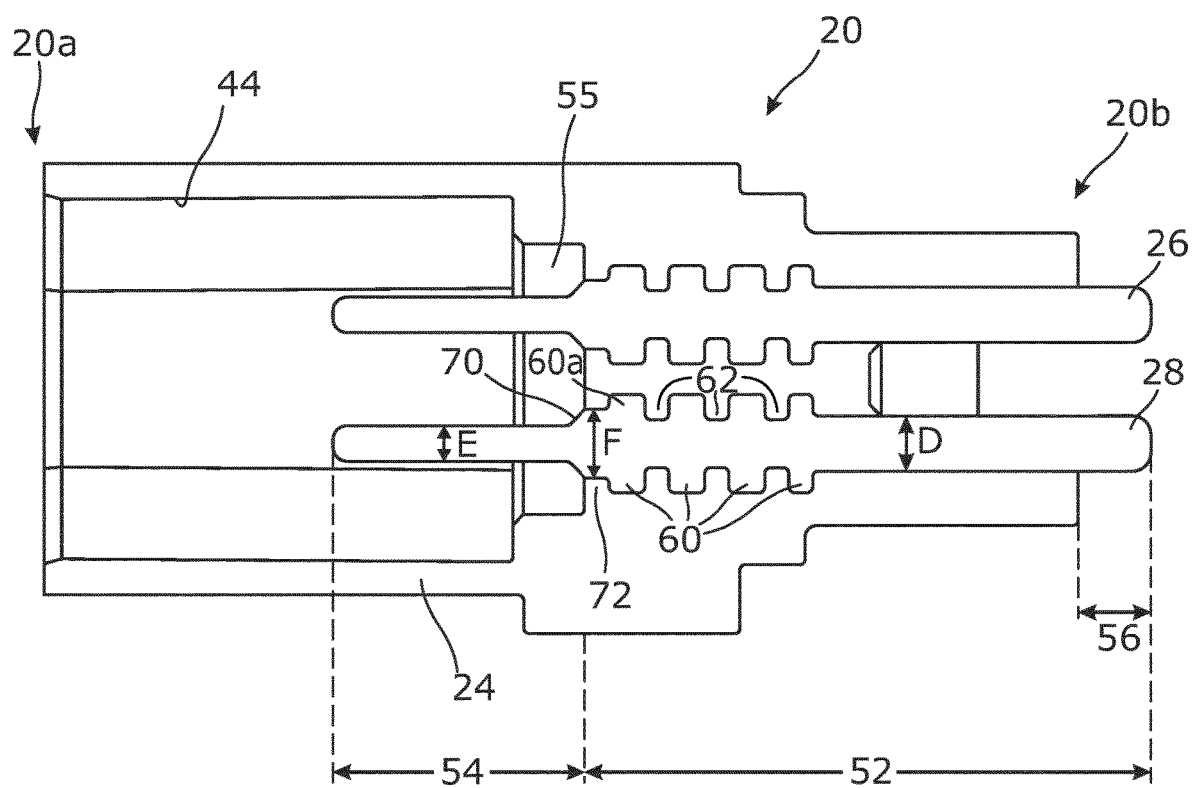
FIG. 3 is a cross-sectional view of an electrical connector according to an embodiment of the invention.

Referring also to FIG. 3, the electrical connector 20 includes an open end 20a which defines a socket for a complementary connector (not shown) for the ECU, and a pump-attachment end 20b which attaches to a connector forming part of the pump unit 10. The first and second connector pins 26, 28 extend into a recess 44 defined at the open end 20a of the connector 20 so that the pins 26, 28 are accessible for electrical contact with the ECU connector to complete the electrical connection to the ECU.

It is one of the challenges with the electrical connector 20 to avoid leakage fuel from within the pump unit 10 passing along and around the electrical connector pins 26, 28, leaking from the pump-attachment end 20b of the connector 20 towards the open end 20a of the connector 20, as this can cause damage to the electrical parts and/or affect pump performance. The present invention is configured to avoid this problem.

Figure 4:
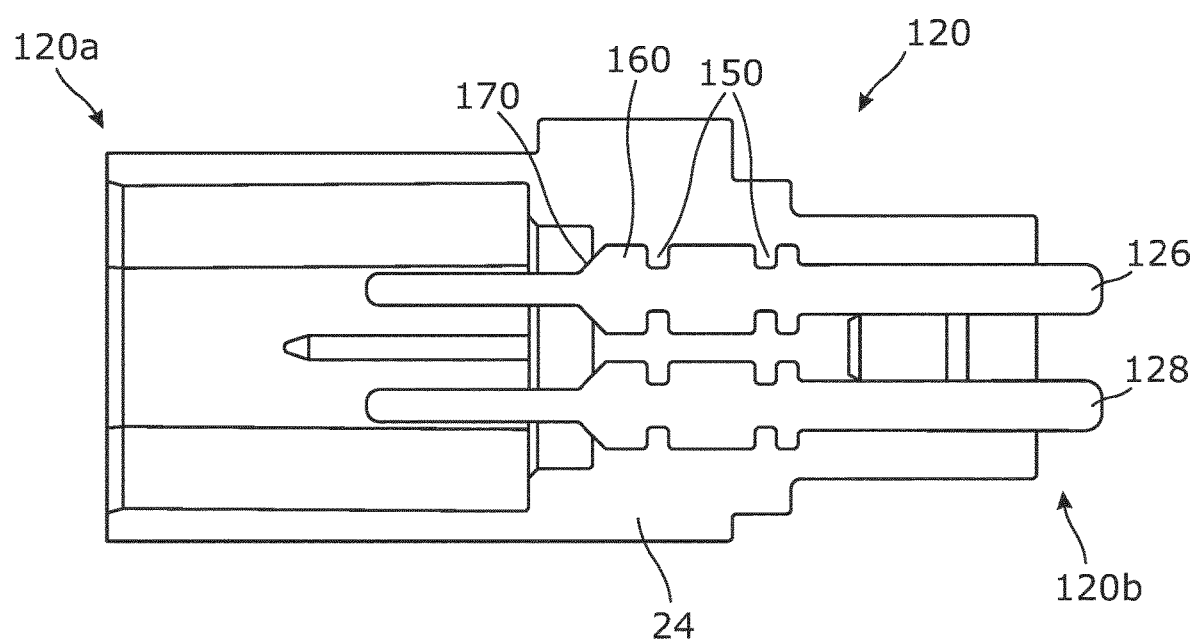
FIG. 4 is a cross-sectional view of an electrical connector according to the state of the art, illustrated for comparison with an electrical connector in FIG. 4.

In order to explain the benefits of the present invention, it is helpful to consider an electrical connector 120 of the state of the art, as shown in FIG. 4. In the connector 120 in FIG. 4, each of the connector pins 126, 128 is substantially cylindrical but has a profiled cross-section along its length, with different regions of the pin having different diameters. For example, each electrical connector pin 126, 128 is provided with first and second annular recesses 150, spaced axially along the length of the connector pin 126, 128. It has been found, however, that a leakage path for fuel can occur along and around the connector pins 126, 128, in regions where the overmould does not make contact with the connector pins 126, 128 adequately, leaving small gaps or pockets which are accessible to fuel leaking from the pump-attachment end 120b. This can arise during the process of overmoulding when the thermoplastic material of the overmould shrinks on cooling, but does not shrink to seal against the connector pins 126, 128 completely in all areas, leaving a leakage path for fuel between the pump-attachment end 120b and the open end 120a of the connector body.

Referring again to FIG. 3, in the present invention, the inventors have realised that a different profile for the connector pins 26, 28 results in the leakage problem being reduced or avoided altogether. In FIG. 3, each connector pin 26, 28 is identical and so only one of the pins will be described in detail.

The connector pin 28 has a profiled cross-section along its length, having a first portion (referred to as the internal portion 52) which is internal to the overmoulded connector body 24 and an external portion 54 (referred to as the connecting portion) which projects into the recess 44 of the open end 20a. The internal portion 52 of the connector pin 28 has a substantially constant dimension in the form of a diameter towards the pump-attachment end 20b, as represented by dimension D in FIG. 3. In other embodiments, where the connector pin 28 has an alternative shape (for example, rectangular or square cross section, or substantially flat), the dimension need not be a diameter of the pin but may be a dimension of the cross section taken in a plane perpendicular to the axial length of the pin.

The so-called internal portion 52 of the connector pin 28 includes a short projecting portion 56 that extends out of the connector body 24 at the pump-attachment end 20b, where it maintains this same constant diameter D. In a region of the internal portion 52 which resides closer to the recess 44, the diameter of the connector pin 28 varies along its length to provide the pin 28 with a series of axially spaced projections 60 and recesses 62. In the example shown in FIG. 3, there are four annular projections 60 along the length of the internal portion 52 of the connector pin 28. The projections 60 represent those regions of the connector pin 28 having the greatest diameter. Adjacent ones of the projections 60 are separated by one of the recesses 62, of which there are three, which represent those regions of the connector pin 28 having the smallest diameter. The radial extent of the projections 60 is therefore such that the diameter of the connector pin 28 in this region extends radially beyond the diameter, D, of the connector pin 28 in the constant diameter region of the internal portion 52, including the projecting portion 56. The recesses 62 are shaped so that in these regions the connector pin 28 has a reduced diameter when compared to the constant diameter region, D, of the internal portion 52.

There are two main benefits of changing the diameter of the connector pin 28. Firstly, as mentioned previously, reducing the diameter of the connector pin 28 relative to the diameter, D, serves to minimise the leak path size if the overmoulding was to shrink away from, or to be poorly adhered to, the connector pin 28. The second benefit is to provide a greater vertical sealing area on the pin, so that as the overmoulding moves during cooling there is a greater chance of some form of seal being maintained between the pin 28 and the overmould, again reducing the risk of leakage.

In other embodiments (not shown) the depth of the recesses 62 may correspond to the constant diameter D of the internal portion 52. Alternatively, the depth of the recesses 62 may be such that the connector pin 28 has a greater diameter in the recessed region 62 compared with the constant diameter region D (i.e. the recesses 62 are shallower than in FIG. 3), although of course the diameter in these recessed regions 62 is still less than the diameter of the projections 60.

Figure 5:
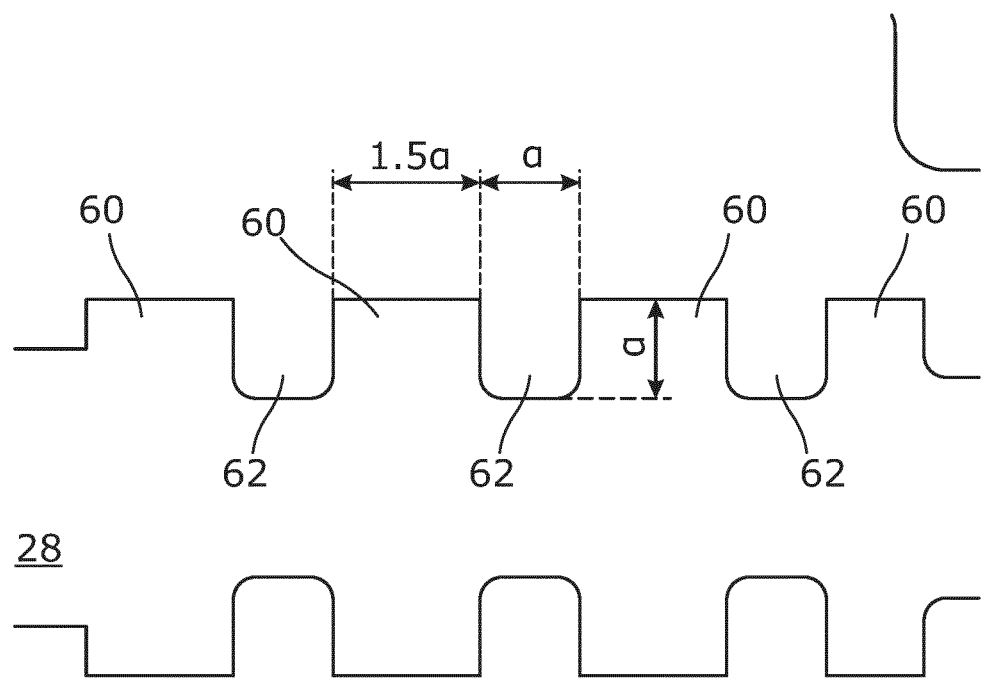
FIG. 5 is an enlarged view of connecting pins of the electrical connector in FIG. 4.

Referring also to FIG. 5, each annular recess 62 has a depth, a, and each annular projection 60 has a height, a. Each projection 60 has an axially extending length, along the axial length of the connector pin 28, equal to 1.5a. Each annular recess 62 has an axially extending length, a, extending along the axial length of the connector pin 28 so that the depth of the recess 62 is the same as its axial length. However, other combinations of dimensions for the axial lengths of the projections 60 and of the recesses 62, and of the depths of the recesses 62 and the heights of the projections 60, are also envisaged. Typically, the axial length, a, of each axial projection may be somewhere between a and 2.0a. The depth of each annular recess 62 may be increased, for example to 1.5a, whilst maintaining sealing benefits.

In comparison with the known electrical connector 120 in FIG. 4, one important feature of the electrical connector 20 in FIG. 3 is that the connector pins 26, 28 are provided with a greater number of projections 60, and with additional recesses 62, along the length of the internal portion 52 of each pin. The increased number of projections 60 and recesses 62 gives an enhanced sealing capability for the overmould as the increased area of contact with the convoluted pin diameter increases the loading of the overmould material onto the pins. This has the effect that leakage of fuel between the pump-attachment end 20b of the connector 20 and the socket end 20a of the connector 20 is improved.

Another important difference compared to the known electrical connector in FIG. 4 relates to the transition between the internal and external portions 52, 54 of the pins 26, 28. The external portion 54 of the connector pin 28 extends into the socket end 20a where it has a substantially constant diameter, E, along its length. The diameter E of the connector pin 28 in this external portion 54 is slightly less than the diameter of the connector pin 28 in the internal portion 52, but equally could be the same as the diameter D in the internal portion 52 (or greater) depending on the nature of the ECU connector with which it is to be coupled. Between the internal and external portions 52, 54 of the connector pin 28 is a chambered portion 70. The chamfered portion 70 allows the diameter of the connector pin 28 to transition smoothly between the internal 52 and external 54 portions of different diameter and provides a locating feature for the connector pin within the socket. An annular piece 55 is located inside the overmould 24 through which the connector pins 26, 28 extend. The annular piece 55 defines an abutment surface for the chamfered portion 70 on each connector pin 28.

Furthermore, the region 72 of the connector pin 28 immediately adjacent to the chamfered portion 70, between the chamfered portion 70 and immediately adjacent to an end one of the projections 60a (far left hand projection in FIG. 3), forms an increased diameter region F compared with the diameter D of the internal portion 52 (the constant diameter region). In this way, the increased diameter region 72 immediately adjacent to the chamfered portion 70 provides an additional "step" on the connector pin 28, immediately before the end one of the projections 60. The step height is typically 0.5a and the length is typically equal to a. This gradual increasing of the diameter—from the external portion 54 of the connector pin 28 (diameter E), to the chamfered portion 70, to the increased diameter region of the step 72 (diameter F) and to the end-most one of the projections 60—provides a further benefit for the overmoulding process with regard to reducing leakage along the connector pin 28 and into the open end 20a, as there is an enhancement of the sealing area between the overmould material and the pins 26, 28 in the stepped region.

In comparison with FIG. 4, it can be seen that this feature of the step 72 is not present and here the chamfered portion 170 connects directly with a projection 160 (greatest diameter region) of the internal portion of the connector pin 28.

The invention therefore relies on two inventive features to provides for an enhanced sealing capability between the overmould and the connector pins 26, 28: the provision of the increased diameter region 72 immediately adjacent to the chamfered region 70 and the provision of additional annular projections along the axial length of the internal portion 52.

In order to manufacture the electrical connector, the first and second connector pins 26, 28 are mounted into a moulding machine and a molten plastic material is injected into the mould. Examples of materials which may be used for the moulding include thermosetting plastic materials, such as PPE, PPS, PBT and PEEK. During the injection process, the temperature and pressure of the injected material is varied to achieve the desired flow rate. The parts are removed from the moulding machine when the injection process is complete and they are then cooled. The sealing capability of the connector is then tested prior to use. When installed in the fuel system, the electrical connector 20 of the invention allows an electrical connection to be made between an engine control unit (ECU) and the pump unit 10 by plugging a connector (not shown) on a connecting cable from the ECU into the open end 20a of the electrical connector 20 so that an electrical connection is made with the connector pins 26, 28 in the recess 44. This electrical connection allows the valves of the pump unit 10 to be controlled electrically by the ECU, whilst ensuring there is minimal or no fuel leakage along and around the connector pins 26, 28 from the pump-attachment end 20b. The reduced leakage results from the innovative manner in which the connector pins 26, 28 are shaped to cooperate with the overmoulded connector body 24 with an enhanced sealing capability.

It will be appreciated that various modifications may be made to the invention without departing from the scope of the invention as set out in the appended claims.

The invention claimed is:

1. An electrical connector for providing, when connected to a complementary electrical connector, an electrical connection within a fuel system; the electrical connector comprising:
    first and second electrical connector pins; and
    an overmould for the first and second electrical connector pins;
    wherein each of the first and second electrical connector pins includes an external portion which projects from the overmould, an internal portion received within the overmould, and a chamfered portion located within the external potion to form a transition between the external portion and the internal portion;
    wherein, for each of the first and second electrical connector pins, the internal portion thereof includes at least two axially spaced projections which extend radially relative to the axis of the electrical connector pin, adjacent ones of the axially spaced projections being separated axially, along the length of the electrical connector pin, by a region of the internal portion defining a recess, the region having a reduced dimension in a plane perpendicular to the length of the electrical connector pin, compared to a region of the electrical connector pin within the overmould between the chamfered portion and immediately adjacent to an end one of the projections.

2. The electrical connector as claimed in claim 1, wherein the first and second electrical connector pins are of cylindrical form so that the region of the internal portion of reduced dimension has a first diameter compared to a diameter of the region immediately adjacent to the chamfered portion.

3. The electrical connector as claimed in claim 1, wherein the region immediately adjacent to the chamfered portion is immediately adjacent to an end one of the projections.

4. The electrical connector as claimed in claim 1, wherein the axially spaced projections are annular projections carried by the internal portion.

5. The electrical connector as claimed in claim 1, comprising at least three axially spaced projections.

6. The electrical connector as claimed in claim 5, wherein the axially spaced projections are equi-axially spaced along the internal portion.

7. The electrical connector as claimed in claim 1, wherein the axial length of at least one of the projections is between 1.0 and 2.0 times the axial length of one of the recesses in the plane perpendicular to the length of the electrical connector pin.

8. The electrical connector as claimed in claim 1, wherein the axial length of at least one of the projections is the same as the depth of at least one of the recesses in the plane perpendicular to the length of the electrical connector.

9. The electrical connector as claimed in claim 1, wherein each of the axially spaced projections has an axial length which is the same as that of the other projections.

10. The electrical connector as claimed in claim 1, wherein each of the annular recesses has a depth in the plane perpendicular to the length of the electrical connector pin which is the same as that of the other annular recess or recesses.

11. A pump comprising an electrical connector as claimed in claim 1 in electrical connection with an electrical connector of the pump.

12. A fuel system comprising a pump, a controller for the pump and an electrical connector as claimed in claim 1 for providing an electrical connection between the controller and the pump.

* * * * *